(12) United States Patent
Hase

(10) Patent No.: US 10,458,539 B2
(45) Date of Patent: Oct. 29, 2019

(54) VEHICLE CONTROL DEVICE

(71) Applicant: DENSO CORPORATION, Kariya, Aichi-pref. (JP)

(72) Inventor: Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 15/745,976

(22) PCT Filed: Sep. 5, 2016

(86) PCT No.: PCT/JP2016/075930
§ 371 (c)(1),
(2) Date: Jan. 18, 2018

(87) PCT Pub. No.: WO2017/056859
PCT Pub. Date: Apr. 6, 2017

(65) Prior Publication Data
US 2018/0209535 A1    Jul. 26, 2018

(30) Foreign Application Priority Data

Oct. 2, 2015 (JP) ................. 2015-196525

(51) Int. Cl.
*F16H 61/12* (2010.01)
*F16H 59/10* (2006.01)
*F16H 61/00* (2006.01)

(52) U.S. Cl.
CPC .......... *F16H 61/12* (2013.01); *F16H 59/105* (2013.01); *F16H 2061/0056* (2013.01); *F16H 2061/1208* (2013.01); *F16H 2061/1224* (2013.01)

(58) Field of Classification Search
CPC .............................. F16H 2061/0056
See application file for complete search history.

(56) References Cited

U.S. PATENT DOCUMENTS

| 2005/0126322 | A1* | 6/2005 | Kozaki | F16H 59/105 74/335 |
| 2009/0062064 | A1* | 3/2009 | Kamada | F16H 59/105 477/34 |
| 2011/0112736 | A1* | 5/2011 | Nakade | B60T 7/12 701/58 |
| 2012/0022754 | A1 | 1/2012 | Ueno | |

FOREIGN PATENT DOCUMENTS

| JP | H03-255262 A | 11/1991 |
| JP | H05-203036 A | 8/1993 |
| JP | 2005-172016 A | 6/2005 |
| JP | 2007-223384 A | 9/2007 |
| JP | 2009-293498 A | 12/2009 |

* cited by examiner

*Primary Examiner* — Timothy Hannon
(74) *Attorney, Agent, or Firm* — Oliff PLC

(57) ABSTRACT

When a malfunction occurs in an A-CPU among multiple CPUs, a retracting traveling control is performed to control a vehicle driving force with a CPU other than the A-CPU. During the retracting traveling control, a shift position is determined with a CPU other than the A-CPU according to an output signal of a shift sensor, and a reduction determination is performed to reduce a shift position, which is to be determined, to be less than a normal state. In this way, the shift position is determined and the retracting traveling is performed even during the retracting traveling control.

7 Claims, 12 Drawing Sheets

FIG. 2

FIRST EMBODIMENT

|  | A-CPU | B-CPU | C-CPU |
|---|---|---|---|
| P SENSOR | 0 | - | 0 |
| R SENSOR | - | 0 | 0 |
| N SENSOR | 0 | - | 0 |
| D SENSOR | 1 | 1 | - |
| B SENSOR | 0 | 0 | - |

- : NO SIGNAL

|   | A-CPU | B-CPU | C-CPU |
|---|---|---|---|
| P SENSOR | 0 | – | 0 |
| R SENSOR | – | 0 | 0 |
| N SENSOR | 0 | – | 0 |
| D SENSOR | 1 | 0 | – |
| B SENSOR | 0 | 1 | – |

(b)

|   | A-CPU | B-CPU | C-CPU |
|---|---|---|---|
| P SENSOR | 1 | – | 0 |
| R SENSOR | – | 0 | 0 |
| N SENSOR | 0 | – | 0 |
| D SENSOR | 0 | 0 | – |
| B SENSOR | 0 | 1 | – |

(c)

|   | A-CPU | B-CPU | C-CPU |
|---|---|---|---|
| P SENSOR | 0 | – | 0 |
| R SENSOR | – | 1 | 1 |
| N SENSOR | 0 | – | 0 |
| D SENSOR | 1 | 0 | – |
| B SENSOR | 0 | 0 | – |

FIG. 6

SECOND EMBODIMENT

|   | A-CPU | B-CPU | C-CPU |
|---|---|---|---|
| P SENSOR | 0 | 0 | - |
| R SENSOR | 0 | 0 | 0 |
| N SENSOR | 0 | 0 | - |
| D SENSOR | 1 | 1 | 1 |
| B SENSOR | 0 | 0 | |

FIG. 7

THIRD EMBODIMENT

|   | A-CPU | B-CPU | C-CPU |
|---|---|---|---|
| P SENSOR | 0 | 0 | - |
| R SENSOR | 0 | 0 | - |
| N SENSOR | 0 | 0 | - |
| D SENSOR | 1 | 1 | 1 |
| B SENSOR | 0 | 0 | |

FOURTH EMBODIMENT

|  | A − CPU | | B − CPU | |
|---|---|---|---|---|
|  | DETERMINATION UNIT | MONITORING UNIT | DETERMINATION UNIT | MONITORING UNIT |
| P SENSOR | 0 | 0 | − | − |
| R SENSOR | 0 | 0 | 0 | 0 |
| N SENSOR | 0 | 0 | − | − |
| D SENSOR | 1 | 1 | 1 | 1 |
| B SENSOR | 0 | 0 | | |

FIFTH EMBODIMENT

FIFTH EMBODIMENT

|  | A-CPU | B-CPU |
|---|---|---|
| P SENSOR | 0 | 0 |
| R SENSOR | 0 | 0 |
| N SENSOR | 0 | 0 |
| D SENSOR | 1 | 1 |
| B SENSOR | 0 | 0 |

SIXTH EMBODIMENT

VEHICLE CONTROL DEVICE

CROSS REFERENCE TO RELATED APPLICATION

This application is based on Japanese Patent Application No. 2015-196525 filed on Oct. 2, 2015, the disclosure of which is incorporated herein by reference.

TECHNICAL FIELD

The present disclosure relates to a vehicle control device including a shift sensor configured to send multiple signals according to a shift position which is a manipulated position of a shift lever.

BACKGROUND ART

For example, Patent Literature 1 discloses a shift sensor for detecting a shift position. This is equipped with, for example, six sensors corresponding to six shift positions and is configured to change an output signal of each of the sensors according to the shift position. For example, when the shift position is at the D range, a signal of the sensor corresponding to the D range is set to "1," and signals of the sensor corresponding to other ranges are set to "0" respectively. A drive control unit of a vehicle determines the shift position according to the output signal of the shift sensor and performs a control according to the shift position.

PRIOR TECHNICAL LITERATURE

Patent Literature

PATENT LITERATURE 1: Publication of unexamined Japanese application No. 2007-223384

However, a concern arises that a certain configuration of a signal of a shift sensor and a control circuit would affect on its mountability on a vehicle.

SUMMARY OF INVENTION

It is an object of the present disclosure to produce a vehicle control device enabled to determine a shift position and to perform a retracting traveling during a retracting traveling control while securing its mountability to a vehicle.

The present applicant researches a system to perform, when a malfunction occurs in a control circuit among multiple control circuits of a drive control unit of a vehicle, a retracting traveling control to manipulate a driving force of the vehicle with a control circuit other than the control circuit, which causes the malfunction. However, the following new issue has arisen through the research process.

A configuration, in which each of control circuits of a drive control unit receives all signals of a shift sensor, is assumed. In this configuration, even in a case where one of the control circuits causes a malfunction during the retracting traveling control, a control circuit, which is other than the one control circuit causing the malfunction, is enabled to determine the shift position according to the output signal of the shift sensor and to perform the retracting traveling. However, the configuration, in which each of the control circuits receives all the signals of the shift sensor, requires an extraordinarily large number of the signal lines to connect the shift sensor with the control circuits. Therefore, a concern arises that its mountability to the vehicle may be exacerbated.

According to one aspect of the present disclosure, a vehicle control device is equipped with a shift sensor, which is to send a plurality of signals according to a shift position being a manipulated position of a vehicle shift lever. The vehicle control device comprises a drive control unit including a plurality of control circuits relevant to a control of a driving force of a vehicle and to determine the shift position according to an output signal of the shift sensor. The drive control unit includes a retracting traveling control unit to perform a retracting traveling control, when a malfunction occurs in one control circuit among the plurality of control circuits, to control the driving force of the vehicle with a control circuit (hereinafter, simply referred to as an other control circuit) other than the control circuit in which a malfunction occurs. The drive control unit further includes a determination control unit to perform a reduction determination during the retracting traveling control to determine the shift position according to the output signal of the shift sensor with the other control circuit and to reduce the shift position, which is to be determined, compared with a normal state.

BRIEF DESCRIPTION OF THE DRAWINGS

The above and other objects, features and advantages of the present disclosure will become more apparent from the following detailed description made with reference to the accompanying drawings. In the drawings:

FIG. 2 is a view showing signals of a shift sensor received by each of CPUs according to the first embodiment;

FIG. 4 is an explanatory view showing a method to specify a malfunctioning CPU;

FIG. 6 is a view showing signals of a shift sensor received by each of CPUs according to the second embodiment;

FIG. 7 is a view showing signals of a shift sensor received by each of CPUs according to a third embodiment;

DESCRIPTION OF EMBODIMENTS

Figure 1:
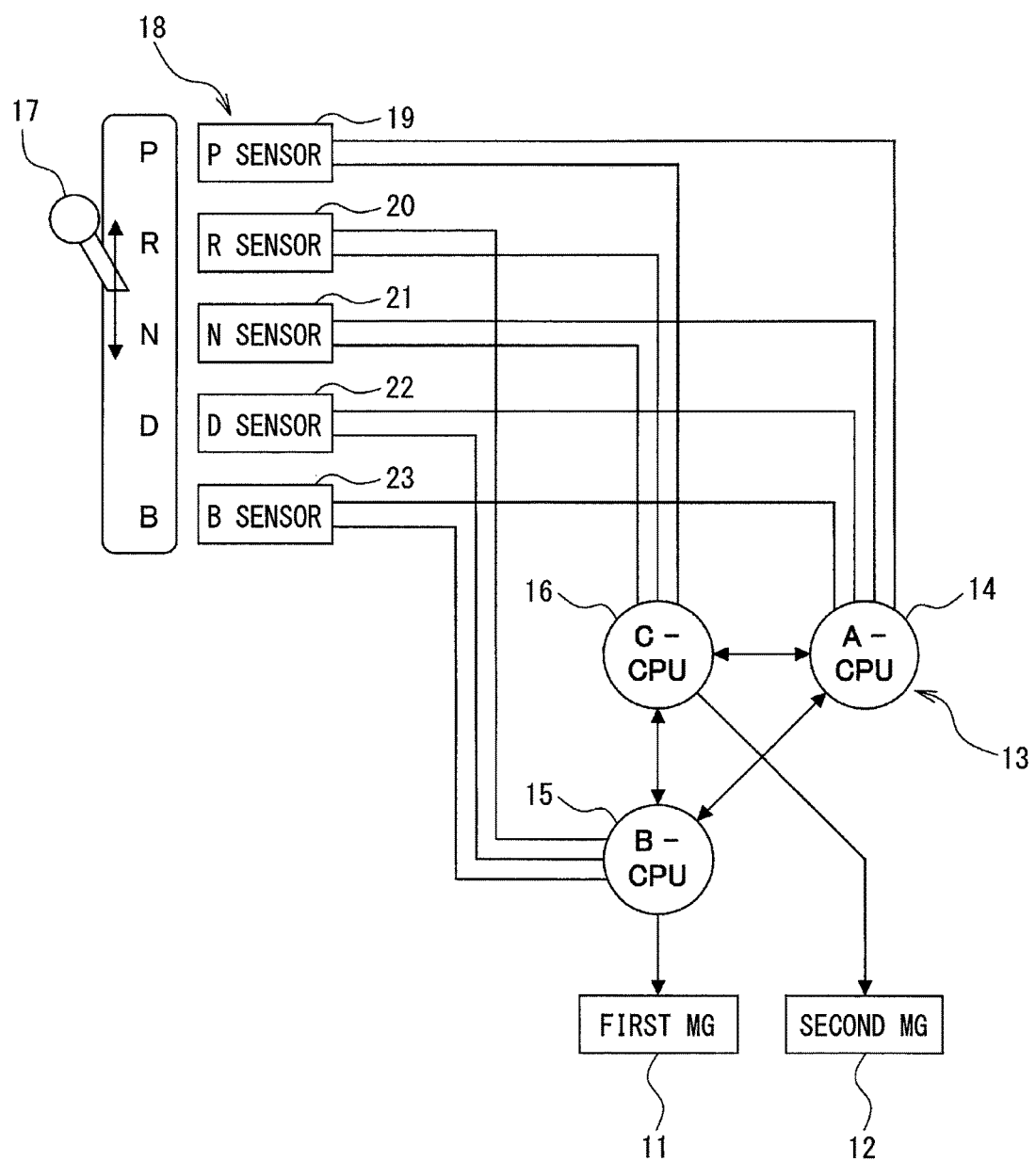
FIG. 1 is a diagram showing an outline of a vehicle control system according to a first embodiment.

As follows, embodiments embodying modes to practice the present disclosure will be described.

First Embodiment

The first embodiment of the present disclosure will be described with reference to FIGS. 1 to 4.

To begin with, an outline of a vehicle control system will be described with reference to FIG. 1.

As vehicle driving sources, a first motor generator (hereinafter denoted as "first MG") 11 and a second motor generator (hereinafter denoted as "second MG") 12 are equipped. The vehicle drive control unit 13 is equipped with an A-CPU 14, a B-CPU 15, and a C-CPU 16 as multiple control circuits related to a control of a vehicle driving force. The A-CPU 14 is, for example, a hybrid CPU which comprehensively controls the vehicle. The B-CPU 15 is, for example, a first MG-CPU which controls the first MG 11. The C-CPU 15 is, for example, a second MG-CPU which controls the second MG 12.

The A-CPU 14 reads output signal of various sensors, such as a shift sensor 18, which will be described later, an accelerator sensor, a brake sensor, and a vehicle speed sensor (not shown) and detects a vehicle operation state. The A-CPU 14 transmits and receives a control signal and a data signal with the B-CPU 15 and the C-CPU 16 and controls the MG 11 and MG 12 and the like with each of the CPUs 15 and 16 according to the vehicle operation state.

In addition, the shift sensor 18 is equipped for detecting a shift position which is a manipulated position of the shift lever 17. The shift lever 17 is enabled to switchover among, for example, five shift positions including a P range, an R range, an N range, a D range, and a B range. Herein, the P range represents a parking range. The R range represents a reverse range. The N range represents a neutral range. The D range represents a drive range. The B range represents a brake range.

The shift sensor 18 is equipped with five sensors 19 to 23 corresponding to the five shift positions. An output signal of each of the sensors 19 to 23 is configured to change according to the shift position.

Specifically, when the shift position is in the P range, the signal of the P sensor 19, which corresponds to the P range, is set to "1" to represent ON, and the signals of the sensors 20 to 23, which correspond to other ranges than the P range, are set to "0" to represent OFF.

In addition, when the shift position is in the R range, the signal of the R sensor 20, which corresponds to the R range, is set to "1," and the signals of the sensors 19, 21 to 23, which correspond to other ranges than the R range, are set to "0."

In addition, when the shift position is in the N range, the signal of the N sensor 21, which corresponds to the N range, is set to "1," and the signals of the sensors 19, 20, 22, 23, which correspond to other ranges than the N range, are set to "0."

In addition, when the shift position is in the D range, the signal of the D sensor 22, which corresponds to the D range, is set to "1," and the signals of the sensors 19 to 21, 23, which correspond to other ranges than the D range, are set to "0."

In addition, when the shift position is in the B range, the signal of the B sensor 23, which corresponds to the B range, is set to "1," and the signals of the sensors 19 to 22, which correspond to other ranges than the B range, are set to "0."

As shown in FIG. 1 and FIG. 2, the drive control unit 13 is connected with the shift sensor 18 to receive the signals, which correspond to the respective shift positions of the shift sensor 18, with two of the three CPUs 14 to 16 and to determine the shift position with two of the three CPUs 14 to 16.

Specifically, the signal lines of the P sensor 19 are connected to the A-CPU 14 and the C-CPU 16, and the signal of the P sensor 19 is received into the A-CPU 14 and the C-CPU 16.

In addition, the signal lines of the R sensor 20 are connected to the B-CPU 15 and the C-CPU 16, and the signal of the R sensor 20 is received into the B-CPU 15 and the C-CPU 16.

In addition, the signal lines of the N sensor 21 are connected to the A-CPU 14 and the C-CPU 16, and the signal of the N sensor 21 is received into the A-CPU 14 and the C-CPU 16.

In addition, the signal lines of the D sensor 22 are connected to the A-CPU 14 and the B-CPU 15, and the signal of the D sensor 22 is received into the A-CPU 14 and the B-CPU 15.

In addition, the signal lines of the B sensor 23 are connected to the A-CPU 14 and the B-CPU 15, and the signal of the B sensor 23 is received into the A-CPU 14 and the B-CPU 15.

Each of the CPUs 14 to 16 determines, as the present shift position, the range corresponding to the sensor which receives the signal at "1." For example, as shown in FIG. 2, when the shift position is in the D range, the signal of the D sensor 22 is at "1." In this case, the A-CPU 14 receives the input signal at "1" from the D sensor 22 and therefore determines that the shift position is in the D range. The B-CPU 15 also receives the input signal at "1" from the D sensor 22 and therefore determines that the shift position is in the D range. The C-CPU 16 does not have the sensor receiving the input signal at "1" and therefore does not determine the shift position.

The drive control unit 13 performs a normal traveling control in a normal state where the drive control unit 13 is in a steady state. In the normal traveling control, the A-CPU 14 computes a vehicle requested driving torque according to output signals of various kinds of sensors and the like and computes an instruction torque of the first MG 11 and an instruction torque of the second MG 12 according to the requested driving torque. Furthermore, the A-CPU 14 sends the instruction torque of the first MG 11 to the B-CPU 15 and sends the instruction torque of the second MG 12 to the C-CPU 16. In response, the B-CPU 15 controls the first MG 11 according to the instruction torque of the first MG 11. The C-CPU 16 controls the second MG 12 according to the instruction torque of the second MG 12.

At this time, the drive control unit 13 determines the shift position with each of the CPUs 14 to 16 according to the output signals of the shift sensor 18, that is, from the sensors 19 to 23. The drive control unit 13 finally determines the shift position according to those determination results.

For example, the drive control unit 13 determines that the shift position is in the P range in a case where the determination result of the A-CPU 14 is the P range (that is, the P sensor 19 has the input signal at "1") and where the determination result of the B-CPU 15 is nothing (that is, no sensor has the input signal at "1") and where the determination result of the C-CPU 16 is the P range.

In addition, the drive control unit 13 determines that the shift position is in the R range in a case where the determination result of the A-CPU 14 is nothing and where the determination result of the B-CPU 15 is the R range (that is, the R sensor 20 has the input signal at "1") and where the determination result of the C-CPU 16 is the R range.

In addition, the drive control unit 13 determines that the shift position is in the N range in a case where the determination result of the A-CPU 14 is the N range (that is, the N sensor 21 has the input signal at "1") and where the determination result of the B-CPU 15 is nothing and where the determination result of the C-CPU 16 is the N range.

In addition, the drive control unit 13 determines that the shift position is in the D range in a case where the determination result of the A-CPU 14 is the D range (that is, the D sensor 22 has the input signal at "1") and where the determination result of the B-CPU 15 is the D range and where the determination result of the C-CPU 16 is nothing.

In addition, the drive control unit 13 determines that the shift position is in the B range in a case where the determination result of the A-CPU 14 is the B range (that is, the B sensor 23 has the input signal at "1") and where the determination result of the B-CPU 15 is the B range and where the determination result of the C-CPU 16 is nothing.

When a malfunction occurs in the A-CPU 14, the A-CPU 14 may become unable to compute the requested driving torque and the instruction torque normally. Therefore, the drive control unit 13 performs, when a malfunction occurs in the A-CPU 14, a retracting traveling control to control the vehicle driving force with the CPUs 15 and 16 other than the A-CPU 14 in which a malfunction occurs. Furthermore, the drive control unit 13 determines, during the retracting traveling control, the shift position according to the output signals from the shift sensor 18 with the CPUs 15 and 16 other than the A-CPU 14, in which a malfunction occurs. In addition, the drive control unit 13 performs a reduction determination to reduce the shift positions, which are to be determined, to be less than those in the normal state.

Figure 3:
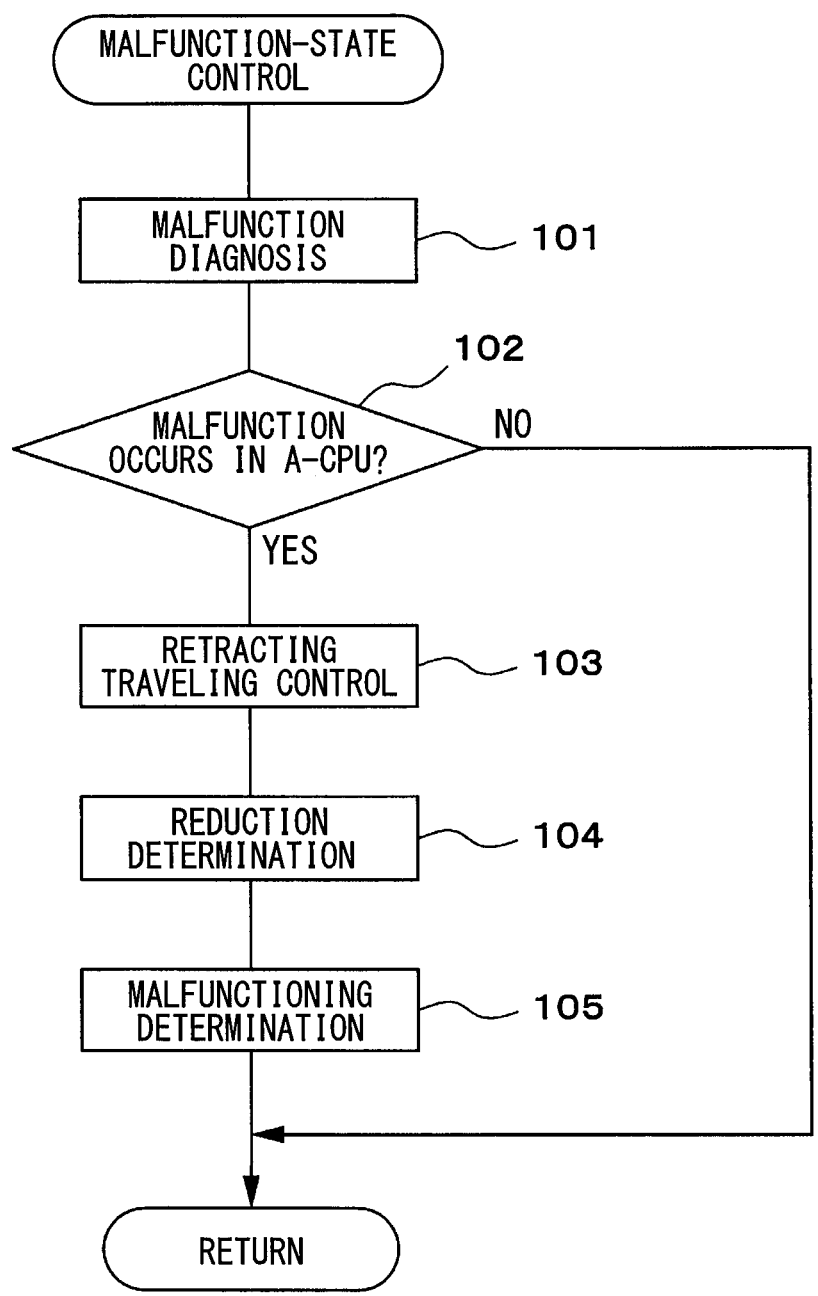
FIG. 3 is a flowchart showing a flow of processing of a malfunction-state control routine.

The drive control unit 13 executes the retracting traveling control and the reduction determination according to a malfunction-state control routine in FIG. 3. As follows, contents of the processing of the routine will be described.

The malfunction-state control routine of FIG. 3 first performs, at step 101, a malfunction diagnosis of the A-CPU 14 with, for example, at least one of methods (1) to (4) as follows.

(1) The A-CPU 14 is configured with a lockstep microcomputer (that is, a microcomputer including dual lockstep cores in which two cores monitor operations each other) and is configured not to send a signal unless processing results of the two cores coincide. In this case, the drive control unit 13 makes a determination of malfunctioning on detection that the signal is not sent.

(2) A self-monitoring unit is equipped inside the A-CPU 14. The drive control unit 13 determines presence or absence of a malfunction in the A-CPU 14 with the self-monitoring unit.

(3) A monitoring unit is equipped outside the A-CPU 14. The drive control unit 13 determines present or absence of a malfunction in the A-CPU 14 with the monitoring unit performing a ROM check and a RAM check.

(4) The C-CPU 16 monitors information on the A-CPU 14 and determines presence or absence of a malfunction.

The malfunction-diagnosis method for the A-CPU 14 is not limited to the methods (1) to (4) and may be arbitrarily modified.

Subsequently, the routine proceeds to step 102 where it is determined whether a malfunction occurs in the A-CPU 14. When it is determined that a malfunction occurs in the A-CPU 14 at step 102, the routine proceeds to step 103. At step 103, the retracting traveling control is performed to control the vehicle driving force with the CPUs 15 and 16 other than the A-CPU 14 in which a malfunction occurs. The processing at step 103 serves as a retracting traveling control unit.

In the retracting traveling control, for example, the C-CPU 16 computes a vehicle requested driving torque according to output signals of various kinds of sensors and the like and computes an instruction torque of the first MG 11 and an instruction torque of the second MG 12 according to the requested driving torque. Furthermore, the C-CPU 16 sends the instruction torque of the first MG 11 to the B-CPU 15. In response, the B-CPU 15 controls the first MG 11 according to the instruction torque of the first MG 11. The C-CPU 16 controls the second MG 12 according to the instruction torque of the second MG 12.

Subsequently, the routine proceeds to step 104 where the CPUs 15 and 16 other than the A-CPU 14, in which a malfunction occurs, determines the shift position according to the output signals from the shift sensor 18 and performs the reduction determination to reduce the shift positions, which are to be determined, to be less than those in the normal state. The processing at step 104 serves as a determination control unit.

In the reduction determination, the B-CPU 15 and the C-CPU 16 determine the shift position and finally determines the shift position according to the determination result. In that case, the shift positions, which are to be determined, are limited within the D range (that is, advance range), the R range (that is, sternway range), and the N range.

For example, when the determination result of the C-CPU 16 is the P range or the N range and when the B-CPU 15 has no determination result, the shift position is determined to be N range.

In addition, when the determination result of the C-CPU 16 is the R range and when the determination result of the B-CPU 15 is the R range, the shift position is determined to be the R range.

In addition, when the C-CPU 16 has no determination result and when the determination result of the B-CPU 15 is the D range or the B range, the shift position is determined to be the D range.

Subsequently, the routine proceeds to step 105 where a malfunctioning determination is performed to compare the determination results of the shift position of the CPUs 15 and 16 to determine presence or absence of a malfunction. The processing at step 105 also serves as a determination control unit.

In the malfunctioning determination, when the determination result of the C-CPU 16 and the determination result of the B-CPU 15 coincide, it is determined that no malfunction occurs. To the contrary, when the determination result of the C-CPU 16 and the determination result of the B-CPU 15 do not coincide, it is determined that a malfunction occurs. When it is determined that a malfunction occurs, a fail-safe processing is performed to determine the shift position to be the N range.

When, for example, the determination result of the C-CPU 16 is the R range and when the determination result of the B-CPU 15 is the R range, the determination results coincide, and therefore, it is determined that no malfunction occurs.

To the contrary, even though the determination result of the C-CPU 16 is the R range and when the determination result of the B-CPU 15 is the D range or the B range, the determination results do not coincide, and therefore, it is determined that a malfunction occurs. In this case, the shift position is determined to be the N range.

In addition, even though the determination result of the C-CPU 16 is the P range and when the determination result of the B-CPU 15 is the R range, the D range, or the B range, the determination results do not coincide, and therefore, it is determined that a malfunction occurs. In this case, the shift position is determined to be the N range.

In addition, even though the determination result of the C-CPU 16 is the N range and when the determination result of the B-CPU 15 is the R range, the D range, or the B range, the determination results do not coincide, and therefore, it is determined that a malfunction occurs. In this case, the shift position is determined to be the N range.

Furthermore, the determination result of the A-CPU 14, the determination result of the B-CPU 15, and the determination result of the C-CPU 16 may be compared with each other to determine presence or absence of a malfunction.

In a case where a malfunctioning CPU cannot be specified during the retracting traveling control, when determination results of two CPUs among the multiple CPUs 14 to 16 simultaneously change to the same position in response to operation of the shift lever 17 by a driver, the two CPUs are determined to be normal and remaining CPUs are determined to be malfunctioning.

For example, as shown in (a) in FIG. 4, when the determination result of the B-CPU 15 is the B range and when the determination result of the C-CPU 16 is nothing, the shift position is determined to be the D range. Since the determination result of the A-CPU 14 is the D range and does not coincide with the determination result of the B-CPU 15, a malfunction occurs. However, the malfunctioning CPU cannot be specified.

From this state, as shown in (b) in FIG. 4, for example, the determination result of the A-CPU 14 becomes the P range, the determination result of the B-CPU 15 becomes the B range, and the determination result of the C-CPU 16 becomes nothing, in response to an operation of the shift lever 17 by a driver. In this case, it cannot be determined whether a malfunction occurs in the A-CPU 14 or duplex malfunction has developed in the B-CPU 15 and the C-CPU 16.

To the contrary, as shown in (c) in FIG. 4, for example, the determination results of the B-CPU 15 and the C-CPU 16 simultaneously become the R range, in response to an operation of the shift lever 17 by a driver. In this case, it is determined that the B-CPU 15 and the C-CPU 16 are normal, and it is determined that the remaining A-CPU 14 is malfunctioning.

In the present embodiment 1 as described above, when a malfunction occurs in the A-CPU 14 among the multiple CPUs 14 to 16 of the drive control unit 13, the retracting traveling control is performed to control the vehicle driving force with the CPUs 15 and 16 other than the A-CPU 14 in which a malfunction occurs. In this way, it is enabled to perform the retracting traveling of the vehicle even when a malfunction occurs in the A-CPU 14. Furthermore, during the retracting traveling control, the shift position is determined with the CPUs 15 and 16 other than the A-CPU 14, in which a malfunction occurs, according to the output signals from the shift sensor 18. In addition, the reduction determination is performed to reduce the shift positions, which are to be determined, to be less than those in the normal state. In this way, it is enabled to determine the shift position and to perform the retracting traveling even when a malfunction occurs in the A-CPU 14 during the retracting traveling control. In addition, because of the performing the reduction determination, all the signals of the shift sensor 18 need not be received into each of the CPUs 14 to 16. It enables to reduce the number of the signal lines, which connect the shift sensor 18 with the CPU 14 to 16, compared with a configuration in which all the signals of the shift sensor 18 are received into each of the CPUs 14 to 16. It enhances its mountability to a vehicle.

In addition, in the present first embodiment, when the reduction determination is performed during the retracting traveling control, the shift position is determined with the B-CPU 15 and the C-CPU 16, and the determination results of the shift position are compared to each other to determine presence or absence of a malfunction. When it is determined that a malfunction occurs, the shift position is determined to be N range. In this way, it is enabled to monitor whether a malfunction further occurs during the retracting traveling control. Furthermore, when a malfunction occurs, the shift position is determined to be the N range thereby to enable to terminate driving of the vehicle. The shift position may be determined to be the P range when the shift position is determined to be the N range during the retracting traveling control and when the electric power source of a control system including the drive control unit 13 is turned OFF in a condition where the rotational speed of a wheel is 0.

Furthermore, in the present first embodiment, when the reduction determination is performed during the retracting traveling control, the shift positions, which are to be determined, are limited within the D range, the R range, and the N range. In this way, it enables the vehicle to move forward, to move rearward, and to stop during the retracting traveling control, while reducing the shift positions, which are to be determined, compared with the normal state.

In addition, in the present first embodiment, the drive control unit 13 is connected with the shift sensor 18 such that the signal corresponding to each shift position of the shift sensor 18 is received into any two CPUs among the three CPUs 14 to 16 and such that each shift position can be determined with any two CPUs among the three CPUs 14 to 16. In this way, it enables to reduce the number of the signal lines, which connect the shift sensor 18 with the CPU 14 to 16, compared with a configuration, in which all the signals of the shift sensor 18 are received into each of the CPUs 14 to 16, while enabling determination of the shift position.

In the present first embodiment, in a case where a malfunctioning CPU cannot be specified during the retracting traveling control, when the determination results of two CPUs among the multiple CPUs 14 to 16 simultaneously change to the same position in response to an operation of the shift lever 17 by a driver, it determines that the two CPUs are normal and determines that the remaining CPU is malfunctioning. In this way, it enables to specify the malfunctioning CPU.

Second Embodiment

Subsequently, the second embodiment of the present disclosure will be described with FIG. 5 and FIG. 6. It is noted that the same reference numeral will be given to an element which is the same as or similar to that in the first embodiment, and description thereof will be omitted or simplified. Portions distinct from those in the first embodiment will be mainly described.

Figure 5:
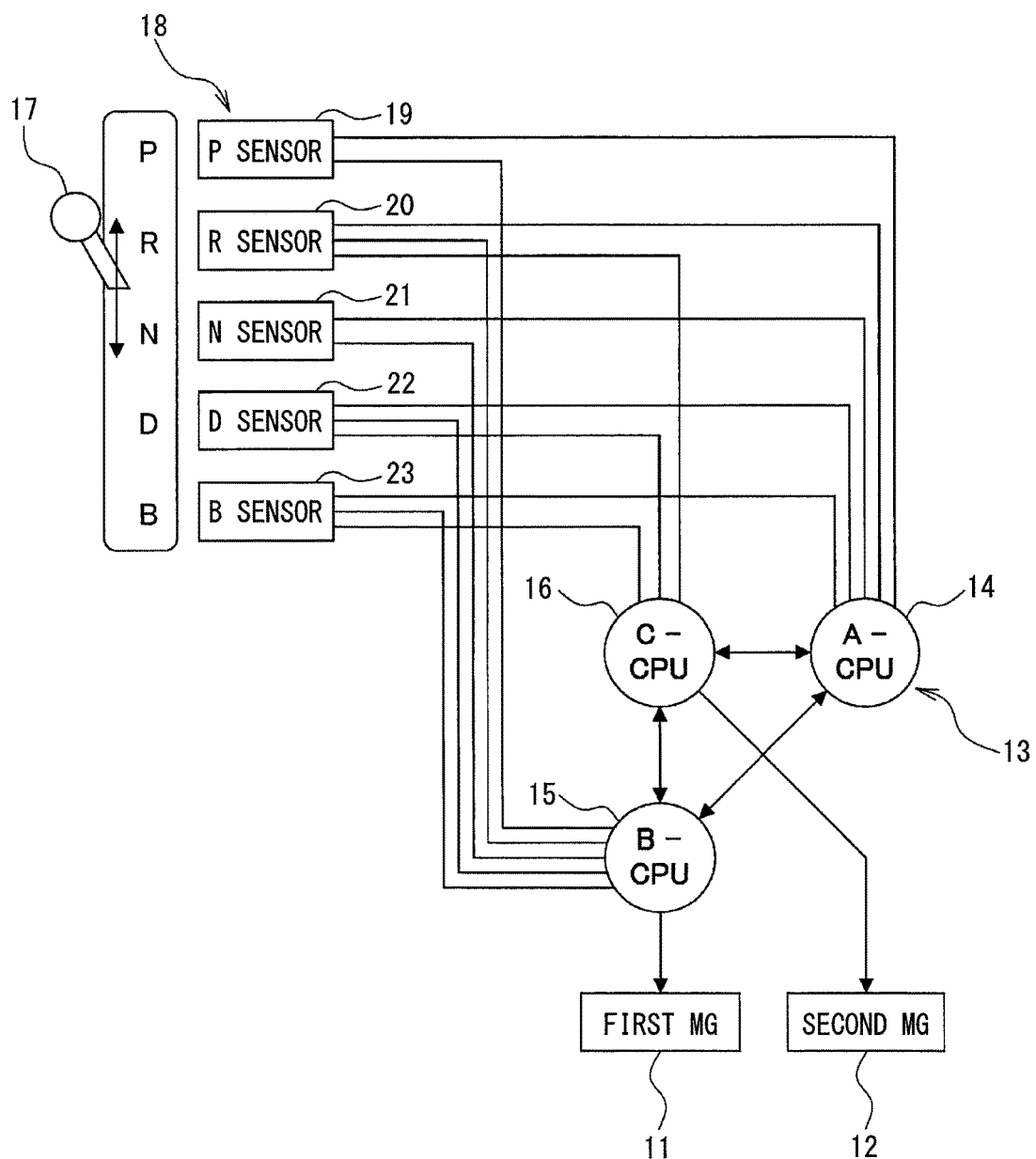
FIG. 5 is a diagram showing an outline of a vehicle control system according to a second embodiment.

In the present second embodiment, as shown in FIG. 5 and FIG. 6, the drive control unit 13 is connected with the shift sensor 18. The C-CPU 16, which is one of the three CPUs 14 to 16, is for malfunction-state determination. Signals corresponding to all the shift positions of the shift sensor 18 are received into the A-CPU 14 and the B-CPU 15. The signals corresponding to the D range and the B range (that is, the forward ranges) and the signal corresponding to the R range (that is, the reverse range) of the shift sensor 18 are received into the C-CPU 16.

Specifically, the signal line of each of the sensors 19 to 23 (that is, the P sensor 19, the R sensor 20, the N sensor 21, the D sensor 22, and the B sensor 23) of the shift sensor 18 is connected to the A-CPU 14 and the B-CPU 15. The signal of each of the sensors 19 to 23 is received into the A-CPU 14 and the B-CPU 15.

The signal lines of the R sensor 20, the D sensor 22, and the B sensor 23 are connected to the C-CPU 16. The signals of the R sensor 20, the D sensor 22, and the B sensor 23 are received into the C-CPU 16. The C-CPU 16 determines the shift position to be the D range when the input signal of the D sensor 22 or the B sensor 23 is "1."

The drive control unit 13 determines the shift position in the normal condition, as follows.

For example, when the determination result of the A-CPU 14 is the P range, when the determination result of the B-CPU 15 is the P range, and when the determination result of the C-CPU 16 is nothing, the shift position is determined to be the P range.

When the determination result of the A-CPU 14 is the R range, when the determination result of the B-CPU 15 is the R range, and when the determination result of the C-CPU 16 is the R range, the shift position is determined to be the R range.

When the determination result of the A-CPU 14 is the N range, when the determination result of the B-CPU 15 is the N range, and when the determination result of the C-CPU 16 is nothing, the shift position is determined to be the N range.

When the determination result of the A-CPU 14 is the D range, when the determination result of the B-CPU 15 is the D range, and when the determination result of the C-CPU 16 is the D range, the shift position is determined to be the D range.

When the determination result of the A-CPU 14 is the B range, when the determination result of the B-CPU 15 is the B range, and when the determination result of the C-CPU 16 is the D range, the shift position is determined to be the B range.

To the contrary, when a malfunction occurs in the A-CPU 14, the retracting traveling control is performed, and the reduction determination is performed during the retracting traveling control. In the reduction determination, the shift position is determined with the B-CPU 15 and the C-CPU 16, and the shift position is finally determined according to the determination result. In that case, the shift positions, which are to be determined, are limited within the D range, the R range, and the N range.

For example, when the determination result of the C-CPU 16 is the R range and when the determination result of the B-CPU 15 is the R range, the shift position is determined to be the R range.

When the determination result of the C-CPU 16 is the D range and when the determination result of the B-CPU 15 is the D range or the B range, the shift position is determined to be the D range.

When the determination result of the C-CPU 16 is nothing and when the determination result of the B-CPU 15 is the P range or the N range, the shift position is determined to be the N range.

Furthermore, the malfunctioning determination is performed to compare the determinations result of the shift position of the CPUs 15 and 16 and to determine presence or absence of a malfunction.

In the malfunctioning determination, for example, when the determination result of the C-CPU 16 is the R range and when the determination result of the B-CPU 15 is the R range, the determination results coincide, and therefore, it is determined that no malfunction occurs.

To the contrary, though the determination result of the C-CPU 16 is the R range, when the determination result of the B-CPU 15 is a range other than the R range, the determination results do not coincide, and therefore, it is determined that a malfunction occurs. In this case, the shift position is determined to be the N range.

In addition, though the determination result of the C-CPU 16 is the D range, when the determination result of the B-CPU 15 is the P range, the R range, or the N range, the determination results do not coincide, and therefore, it is determined that a malfunction occurs. In this case, the shift position is determined to be the N range.

In the present second embodiment as described above, the drive control unit 13 is connected with the shift sensor 18 in the following manner. The C-CPU 16, which is the one of the three CPUs 14 to 16, is set as a CPU for the malfunction-state determination. The signals corresponding to all the shift positions of the shift sensor 18 are received into the A-CPU 14 and the B-CPU 15. The signals corresponding to the D range and the B range (that is, the forward ranges) and the signal corresponding to the R range (that is, the reverse range) of the shift sensor are received into the C-CPU 16. Also in this way, it enables to reduce the number of the signal lines, which connect the shift sensor 18 with the CPUs 14 to 16, compared with a configuration, in which all the signals of the shift sensor 18 are received into each of the CPUs 14 to 16, while enabling determination of the shift position.

Third Embodiment

As follows, the present third embodiment will be described with FIG. 7. It is noted that, the same reference numeral will be given to en element which is the same as or similar to that of the second embodiment, and description thereof will be omitted or simplified. Elements distinct from those in the second embodiment will be mainly described.

In the second embodiment, the signals of the R sensor 20, the D sensor 22, and the B sensor 23 are received into the C-CPU 16. The shift positions, which are to be determined, are limited within the D range, the R range, and the N range, when the reduction determination is performed during the retracting traveling control.

To the contrary, in the present third embodiment, as shown in FIG. 7, only the signals of the D sensor 22 and the B sensor 23 are received into the C-CPU 16. The shift positions, which are to be determined, are limited within the D range and the N range, when the reduction determination is performed during the retracting traveling control.

The drive control unit 13 determines the shift position in the normal condition, as follows.

For example, when the determination result of the A-CPU 14 is the P range, when the determination result of the B-CPU 15 is the P range, and when the determination result of the C-CPU 16 is nothing, the shift position is determined to be the P range.

When the determination result of the A-CPU 14 is the R range, when the determination result of the B-CPU 15 is the R range, and when the determination result of the C-CPU 16 is nothing, the shift position is determined to be the R range.

When the determination result of the A-CPU 14 is the N range, when the determination result of the B-CPU 15 is the N range, and when the determination result of the C-CPU 16 is nothing, the shift position is determined to be the N range.

When the determination result of the A-CPU 14 is the D range, when the determination result of the B-CPU 15 is the D range, and when the determination result of the C-CPU 16 is the D range, the shift position is determined to be the D range.

When the determination result of the A-CPU 14 is the B range, when the determination result of the B-CPU 15 is the B range, and when the determination result of the C-CPU 16 is the D range, the shift position is determined to be the B range.

To the contrary, when a malfunction occurs in the A-CPU 14, the retracting traveling control is performed, and the reduction determination is performed during the retracting traveling control. In the reduction determination, the shift position is determined with the B-CPU 15 and the C-CPU 16, and the shift position is finally determined according to the determination result. In that case, the shift positions, which are to be determined, are limited within the D range and the N range.

For example, when the determination result of the C-CPU 16 is the D range and when the determination result of the B-CPU 15 is the D range or the B range, the shift position is determined to be the D range.

When the determination result of the C-CPU 16 is nothing and when the determination result of the B-CPU 15 is the P range, the R range, or the N range, the shift position is determined to be the N range.

Furthermore, the malfunctioning determination is performed to compare the determinations result of the shift position of the CPUs 15 and 16 and to determine presence or absence of a malfunction.

In the malfunction determination, though the determination result of the C-CPU 16 is the D range, when the determination result of the B-CPU 15 is the P range, the R range, or the N range, the determination results do not coincide, and therefore, it is determined that a malfunction occurs. In this case, the shift position is determined to be the N range.

In the present third embodiment as described above, it limits the shift positions, which are to be determined, within the D range and N range, when the reduction determination is performed during the retracting traveling control. In this way, it enables the vehicle to move forward and to stop during the retracting traveling control, while reducing the shift positions, which are to be determined, compared with the normal state. In addition, it enables to further reduce the number of the signal lines compared with the second embodiment.

Fourth Embodiment

As follows, the present third embodiment will be described with FIG. 8 and FIG. 9. It is noted that, the same reference numeral will be given to en element which is the same as or similar to that of the first embodiment, and description thereof will be omitted or simplified. Elements distinct from those in the first embodiment will be mainly described.

Figure 8:
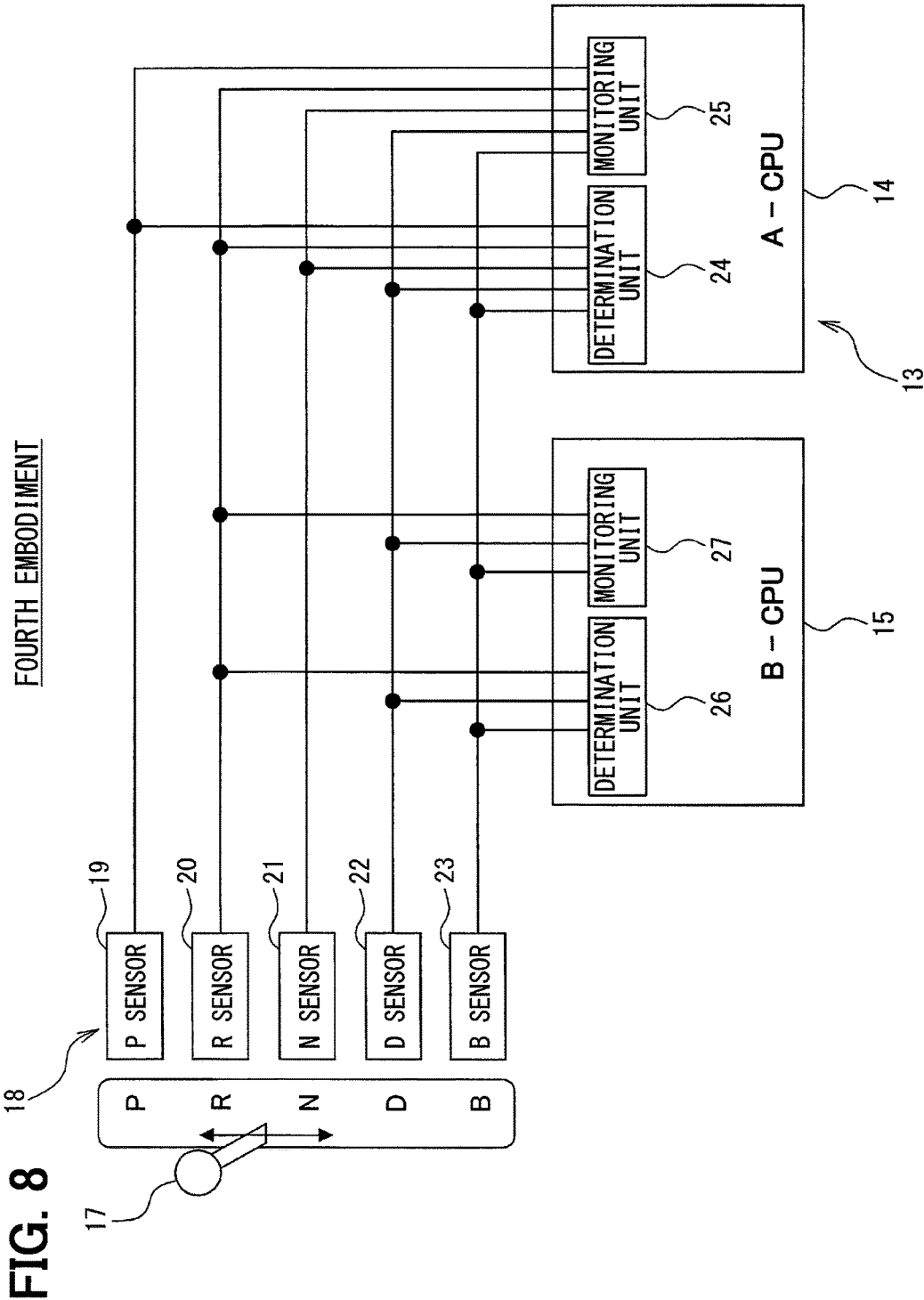
FIG. 8 is a diagram showing an outline of a vehicle control system according to a fourth embodiment.

In the present fourth embodiment, as shown in FIG. 8, the drive control unit 13 is equipped with the A-CPU 14 and the B-CPU 15. The A-CPU 14 is equipped with a determination unit 24, which determines the shift position, and a monitoring unit 25, which determines the shift position similarly to the determination unit 24 and monitors the determination result of the determination unit 24. The B-CPU 15 is equipped with the determination unit 26, which determines the shift position, and the monitoring unit 27, which determines the shift position similarly to the determination unit 26 and monitors the determination result of the determination unit 26.

Figures 9, 10:
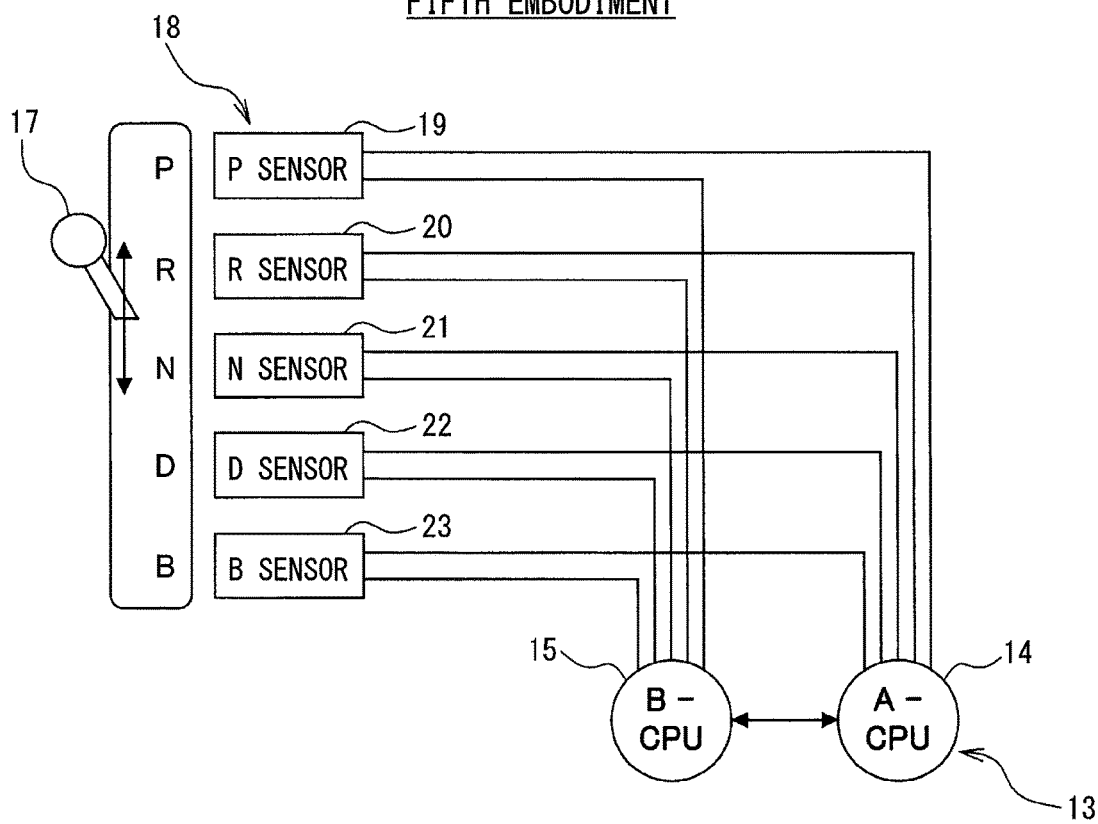
FIG. 9 is a view showing signals of a shift sensor received by each of CPUs according to the fourth embodiment.
FIG. 10 is a diagram showing an outline of a vehicle control system according to a fifth embodiment.

As shown in FIG. 8 and FIG. 9, the signal line of each of the sensors 19 to 23 (that is, the P sensor 19, the R sensor 20, the N sensor 21, the D sensor 22, and the B sensor 23) of the shift sensor 18 is connected to the determination unit 24 and the monitoring unit 25 of the A-CPU 14. The signal of each of the sensors 19 to 23 is received into the determination unit 24 and the monitoring unit 25 of the A-CPU 14.

In addition, the signal lines of the R sensor 20, the D sensor 22, and the B sensor 23 are connected to the determination unit 26 and the monitoring unit 27 of the B-CPU 15. The signals of the R sensor 20, the D sensor 22, and the B sensor 23 are received into the determination unit 26 and the monitoring unit 27 of the B-CPU 15. The determination unit 26 and the monitoring unit 27 of the B-CPU 15 determine the shift position to be D range when the input signal of the D sensor 22 or the B sensor 23 is "1."

The drive control unit 13 determines the shift position in the normal condition, as follows.

The A-CPU 14 compares the determination result of the determination unit 24 with the determination result of the monitoring unit 25 by using the monitoring unit 25 and determines presence or absence of a malfunction. When the determination result of the determination unit 24 and the determination result of the monitoring unit 25 coincide, it determines that no malfunction occurs and adopts the determination result of the determination unit 24. To the contrary, when the determination result of the determination unit 24 and the determination result of the monitoring unit 25 do not coincide, it determines that a malfunction occurs.

For example, when both the determination result of the determination unit 24 and the determination result of the monitoring unit 25 of the A-CPU 14 are the P range, it determines the shift position to be the P range.

When both the determination result of the determination unit 24 and the determination result of the monitoring unit 25 of the A-CPU 14 are the R range, it determines the shift position to be the R range.

When both the determination result of the determination unit 24 and the determination result of the monitoring unit 25 of the A-CPU 14 are the N range, it determines the shift position to be the N range.

When both the determination result of the determination unit 24 and the determination result of the monitoring unit 25 of the A-CPU 14 are the D range, it determines the shift position to be the D range.

When both the determination result of the determination unit 24 and the determination result of the monitoring unit 25 of the A-CPU 14 are the B range, it determines the shift position to be the B range.

To the contrary, when a malfunction occurs in the A-CPU 14, the retracting traveling control is performed in which the B-CPU 15 controls the driving force of the vehicle, and the reduction determination is performed during the retracting traveling control. In the reduction determination, the shift position is determined with the B-CPU 15. In that case, the shift positions, which are to be determined, are limited within the D range, the R range, and the N range.

The B-CPU 15 compares the determination result of the determination unit 26 with the determination result of the monitoring unit 27 by using the monitoring unit 27 and determines presence or absence of a malfunction. When the determination result of the determination unit 26 and the determination result of the monitoring unit 27 coincide, it determines that no malfunction occurs and adopts the determination result of the determination unit 26. To the contrary, when the determination result of the determination unit 26 and the determination result of the monitoring unit 27 do not coincide, it determines that a malfunction occurs.

For example, when both the determination result of the determination unit 26 and the determination result of the monitoring unit 27 of the B-CPU 15 are the R range, it determines the shift position to be the R range.

When both the determination result of the determination unit 26 and the determination result of the monitoring unit 27 of the B-CPU 15 are the D range, it determines the shift position to be the D range.

When the determination result of the determination unit 26 is nothing and when the determination result of the monitoring unit 27 is nothing in the B-CPU 15, it determines the shift position to be the N range.

To the contrary, though the determination result of the determination unit 26 is the R range, when the determination result of the monitoring unit 27 is a range other than the R range in the B-CPU 15, the determination results do not coincide, and therefore, it is determined that a malfunction occurs. In this case, the shift position is determined to be the N range.

In addition, though the determination result of the determination unit 26 is the D range, when the determination result of the monitoring unit 27 is a range other than the D range in the B-CPU 15, the determination results do not coincide, and therefore, it is determined that a malfunction occurs. In this case, the shift position is determined to be the N range.

In addition, though the determination result of the determination unit 26 is nothing, when the determination result of the monitoring unit 27 is a range other than the R range or the D range in the B-CPU 15, the determination results do not coincide, and therefore, it is determined that a malfunction occurs. In this case, the shift position is determined to be the N range.

In the present fourth embodiment as described above, the A-CPU 14 and B-CPU 15 are equipped with the determination units 24 and 26, respectively, which determine the shift position, and the monitoring units 25 and 27, respectively, which monitor the determination results of the determination units 24 and 26, respectively. When the reduction determination is performed during the retracting traveling control, the determination result of the determination unit 25 is monitored with the monitoring unit 27 in the B-CPU 15, and presence or absence of a malfunction is determined. When it is determined that a malfunction occurs, the shift position is determined to be the N range. Also in this way, it further enables to monitor whether a malfunction occurs during the retracting traveling control. Furthermore, it determines the shift position to be the N range when a malfunction occurs thereby to enable to terminate driving of the vehicle.

Fifth Embodiment

Figures 11, 12:
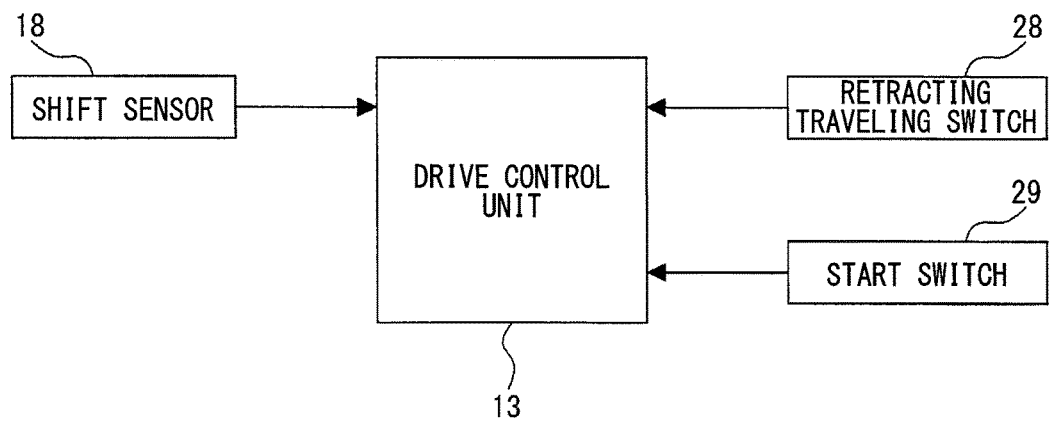
FIG. 11 is a view showing signals of a shift sensor received by each of CPUs according to the fifth embodiment.
FIG. 12 is a block diagram showing a drive control unit and its peripheral configuration according to a sixth embodiment.

As follows, the present fifth embodiment will be described with FIG. 10 and FIG. 11. It is noted that, the same reference numeral will be given to en element which is the same as or similar to that of the first embodiment, and description thereof will be omitted or simplified. Elements distinct from those in the first embodiment will be mainly described.

In the present fifth embodiment, as shown in FIG. 10, the drive control unit 13 is equipped with the A-CPU 14 and the B-CPU 15. As shown in FIG. 10 and FIG. 11, the signal line of each of the sensors 19 to 23 (that is, the P sensor 19, the R sensor 20, the N sensor 21, the D sensor 22, and the B sensor 23) of the shift sensor 18 is connected to the A-CPU 14 and the B-CPU 15. The signal of each of the sensors 19 to 23 is received into the A-CPU 14 and the B-CPU 15.

The drive control unit 13 determines the shift position in the normal condition, as follows.

For example, when both the determination result of the A-CPU 14 and the determination result of the B-CPU 15 are the P range, it determines the shift position to be the P range.

When both the determination result of the A-CPU 14 and the determination result of the B-CPU 15 are the R range, it determines the shift position to be the R range.

When both the determination result of the A-CPU 14 and the determination result of the B-CPU 15 are the N range, it determines the shift position to be the N range.

When both the determination result of the A-CPU 14 and the determination result of the B-CPU 15 are the D range, it determines the shift position to be the D range.

When both the determination result of the A-CPU 14 and the determination result of the B-CPU 15 are the B range, it determines the shift position to be the B range.

To the contrary, when a malfunction occurs in the A-CPU 14, the retracting traveling control is performed in which the B-CPU 15 controls the driving force of the vehicle, and the reduction determination is performed as follows during the retracting traveling control.

To begin with, when a malfunction occurs in the A-CPU 14, the latest shift position, which is determined with the B-CPU 15 (that is, the shift position determined with that B-CPU 15 immediately before the A-CPU 14 is determined to be malfunctioning) is stored as a previous value. For example, when the latest shift position determined with the B-CPU 15 is the D range, the D range is stored as the previous value.

Subsequently, the current value of the shift position determined with the B-CPU 15 is compared with the previous value during the retracting traveling control. When the current value of the shift position determined with the B-CPU 15 is the same as the previous value consequently, the shift position is determined to be the current value (=previous value). Subsequently, when the current value of the shift position determined with the B-CPU 15 is changed to a position different from the previous value, the shift position is determined to be the N range. In this way, it enables to continue the retracting traveling until the current value of the shift position determined with the B-CPU 15 changes to a position different from the previous value.

The present fifth embodiment as described above employs the configuration in which the signals of the shift sensor 18 are received into the two CPUs 14 and 15. Therefore, it enables to reduce the number of the signal lines, which connect the shift sensor 18 with the CPUs 14 and 15, compared with a configuration in which the signals of the shift sensor 18 are received into three CPUs.

In the fifth embodiment as described above, when the current value of the shift position determined with the B-CPU 15 is changed to a position different from the previous value during the retracting traveling control, the shift position is determined to be the N range. Not being limited to this, when the current value of the shift position determined with the B-CPU 15 is changed to a position different from the previous value during the retracting traveling control, it may restrict the vehicle driving force at a safe level (for example, a level at which creep traveling can be performed). In this way, it enables to continue the retracting traveling while securing safety.

Sixth Embodiment

As follows, the present sixth embodiment will be described with FIG. 12 to FIG. 14. It is noted that, the same reference numeral will be given to en element which is the same as or similar to that of the first embodiment, and description thereof will be omitted or simplified. Elements distinct from those in the first embodiment will be mainly described.

The present sixth embodiment is an embodiment implemented as a combination with either of the first to fifth embodiments. In the present sixth embodiment, as shown in FIG. 12, a retracting traveling switch 28 is provided. The retracting traveling switch 28 is a switch device for setting a retracting traveling mode in which the retracting traveling control is performed. A start switch 29 is a switch device for activating a control system including the drive control unit 13. The output signals of the retracting traveling switch 28 and the start switch 29 are received into the drive control unit 13, a start control unit (not shown), and the like.

When the electric power source of the control system is turned OFF (for example, IG-Off), the control system is terminated (that is, the control system becomes Ready-Off). Subsequently, when a normal start operation is performed in a normal state, for example, when the start switch 29 is turned ON in a condition where the shift position is in the P range while the brake is turned ON (the brake pedal is depressed), the electric power source of the control system is turned ON (for example, IG-On), and the control system is started (that is, the control system becomes Ready-On).

As described in the first to fifth embodiments, the drive control unit 13 performs the retracting traveling control when a malfunction occurs in the A-CPU 14. However, in a case where the electric power source of the control system is turned OFF during the retracting traveling mode, which is to perform the retracting traveling control, and where the start switch 29 is turned ON thereafter, the P range may not be detectable due to a malfunction of the CPU of the drive control unit 13, or the like. Therefore, even though the normal start operation is performed, the control system may be disabled to reboot.

Therefore, in the present sixth embodiment, in a condition where the electric power source of the control system is turned OFF during the retracting traveling mode and where the retracting traveling switch 28 is turned ON thereafter (or where the retracting traveling switch 28 is turned ON in response to turning ON of the brake), the control system is rebooted in the retracting traveling mode. The start control is performed according to the start control routine of FIG. 13 and FIG. 14. As follows, the processing of the routine will be described.

Figure 13:
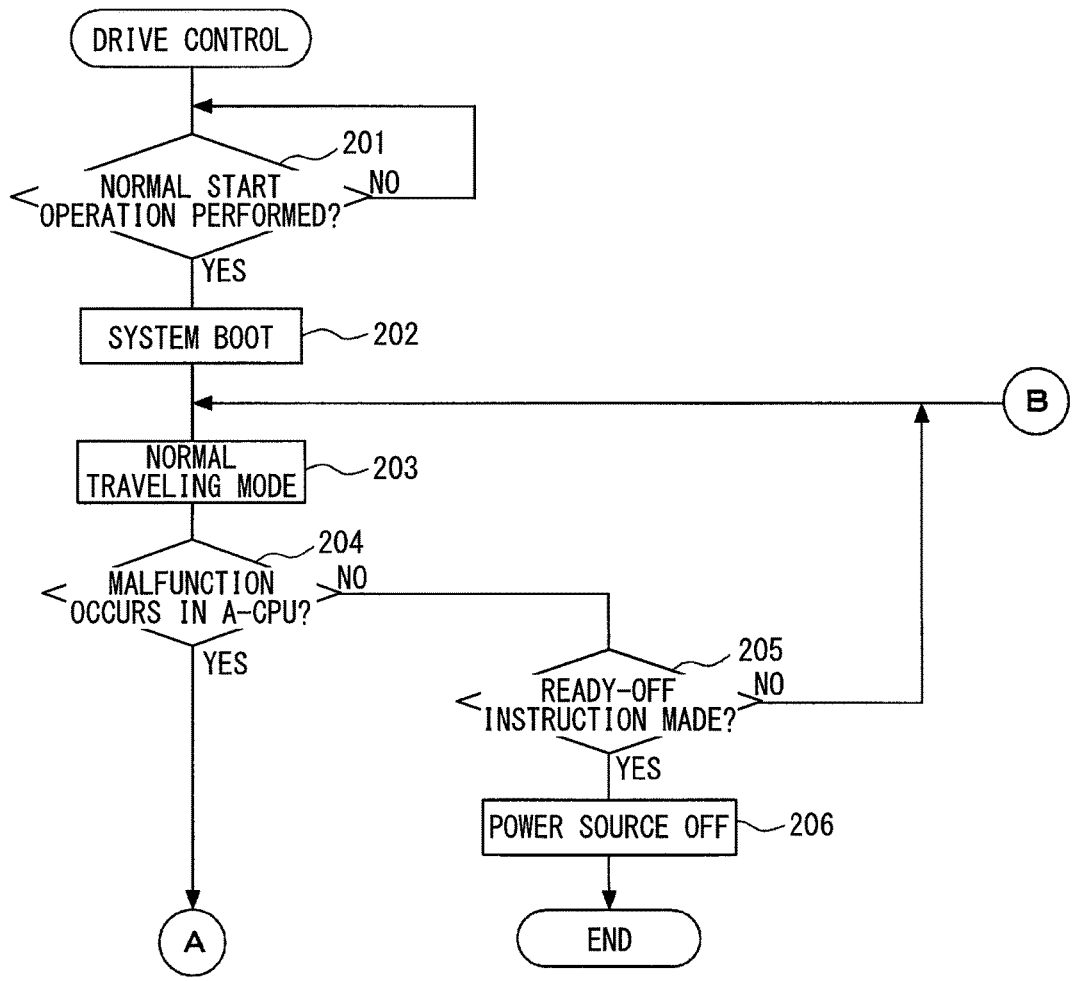
FIG. 13 is a flowchart showing a flow of processing of a start control routine (1) according to a sixth embodiment.
Figure 14:
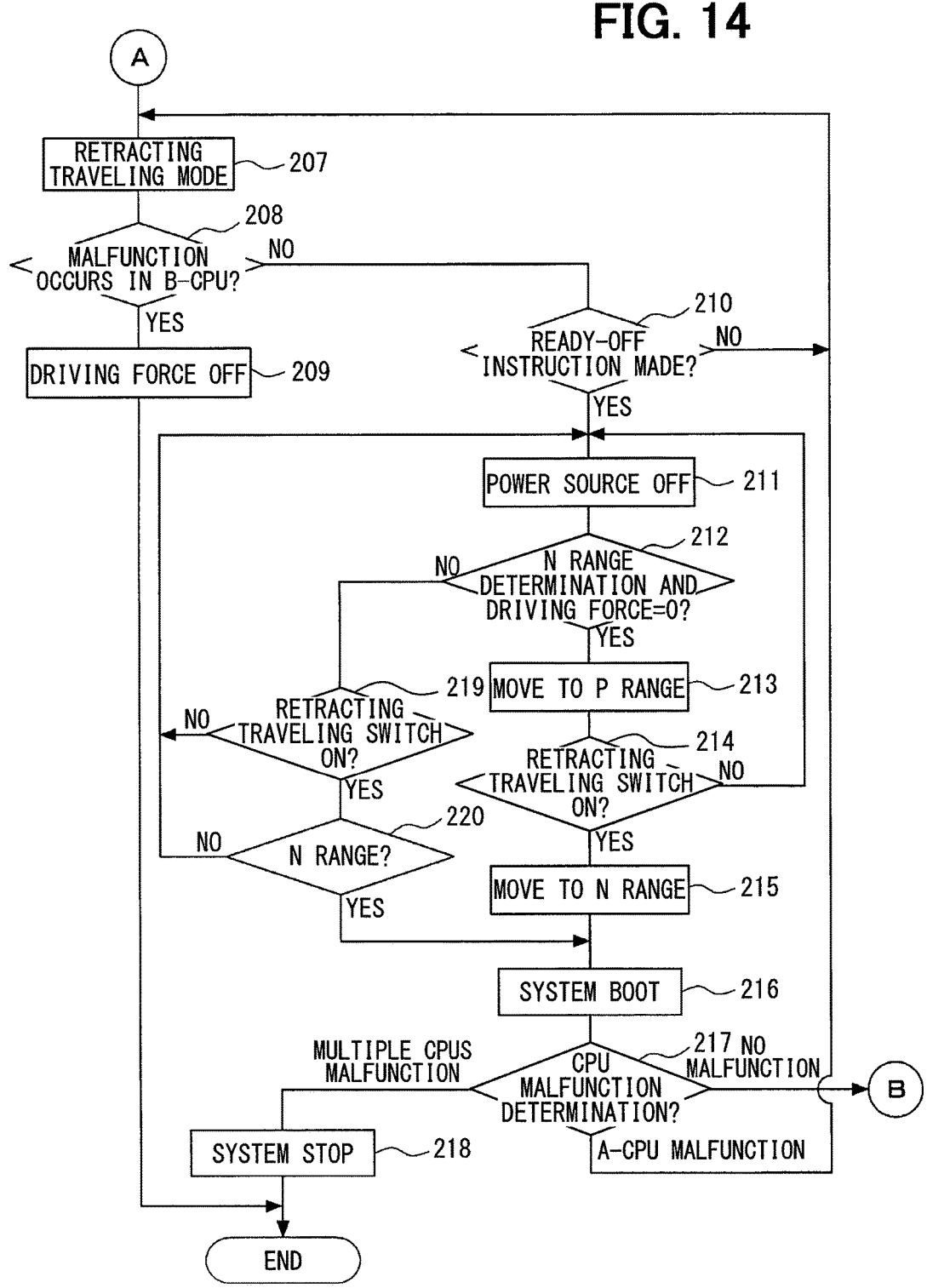
FIG. 14 is a flowchart showing a flow of processing of a start control routine (2) according to the sixth embodiment.

The start control routine of FIG. 13 and FIG. 14 is executed by the drive control unit 13, a start control unit (not shown), and/or the like and serves as a reboot control unit. In the start control routine of FIG. 13 and FIG. 14, at step 201, it is first determined whether the normal start operation is performed during the electric power source of the control system is turned OFF (that is, whether the start switch 29 is turned ON in a condition where the shift position is in the P range and where the brake is turned ON).

When it is determined that the normal start operation is performed at step 201, the routine proceeds to step 202 where the electric power source of the control system is turned ON (for example, IG-On), and the control system is turned ON (that is, the control system is set in Ready-On).

Subsequently, the routine proceeds to step 203 where a normal traveling mode is set in which the normal traveling control is performed and in which the shift position determination in the normal state is performed.

Subsequently, the routine proceeds to step 204 where it is determined whether a malfunction occurs in the A-CPU 14. When it is determined that a malfunction does not occur in the A-CPU 14 at step 204, the routine proceeds to step 205 where it is determined whether an instruction for Ready-Off is made.

When it is determined that the instruction for Ready-Off is not made at step 205, the routine returns to step 203. Subsequently, when it is determined that the instruction for Ready-Off is made at step 205, the routine proceeds to step 206 where the electric power source of the control system is turned OFF (for example, IG-Off), and the control system is terminated (that is, the control system is set in Ready-Off).

To the contrary, when it is determined that a malfunction occurs in the A-CPU 14 at step 204, the routine proceeds to step 207 in FIG. 14 where the retracting traveling mode is set in which the retracting traveling control is performed and in which the reduction determination (that is, the shift position determination during the retracting traveling control) is made.

Subsequently, the routine proceeds to step 208 where it is determined whether a malfunction occurs in the B-CPU 15. When it is determined that a malfunction occurs in the B-CPU 15 at step 208, the routine proceeds to step 209 where the shift position is determined to be the N range and where the vehicle driving force is turned OFF.

When it is determined that a malfunction does not occur in the B-CPU 15 at step 208, the routine proceeds to step 210 where it is determined whether the instruction for Ready-Off is made.

When it is determined that the instruction for Ready-Off is not made at step 210, the routine returns to step 207. Subsequently, when it is determined that the instruction for Ready-Off is made at step 210, the routine proceeds to step 211 where the electric power source of the control system is turned OFF (for example, IG-Off), and the control system is terminated (that is, the control system is set in Ready-Off).

Subsequently, the routine proceeds to step 212 where it is determined whether the shift position is in the N range and where it is determined whether the vehicle driving force is 0 (that is, whether the rotational speed of a wheel is 0).

When the shift position is determined to be the N range and when it is determined that the vehicle driving force is 0 at step 212, the routine proceeds to step 213 where the shift position is determined to be the P range. In this way, when the shift position is determined to be the N range and when the electric power source of the control system is turned OFF in the state where the rotational speed of the wheel is 0 during the retracting traveling control, the shift position is determined to be the P range.

Subsequently, the routine proceeds to step 214 where it is determined whether the retracting traveling switch 28 is turned ON (or whether the retracting traveling switch 28 is turned ON while the brake is turned ON). The vehicle start switch 29 may also serve as the retracting traveling switch 28, and it may be determined that the retracting traveling switch 28 is turned ON when a specific operation (for example, a long push, a double click, or the like) is made on the start switch 29. In this case, a configuration may be employed where the retracting traveling switch 28 is omitted.

At step 214, when it is determined to be "No", the routine returns to step 211. Thereafter, at step 214, when it is determined that the retracting traveling switch 28 is turned ON or when it is determined that the retracting traveling switch 28 is turned ON while the brake is turned ON, the routine proceeds to step 215 where the determination of the shift position is switched from the P range to the N range. Subsequently, the routine proceeds to step 216 where the electric power source of the control system is turned ON (for example, IG-On) to reboot the control system. That is, the control system is rendered Ready-On.

Subsequently, the routine proceeds to step 217 where the CPU malfunctioning determination is executed to determine presence or absence of a malfunction in the CPUs 14 and 15 or in the CPUs 14 to 16.

At step 217, when it is determined that no malfunction occurs in the CPU, the routine returns to step 203 where the normal traveling mode is set. In this way, the control system is rebooted in the normal traveling mode.

To the contrary, when it is determined that a malfunction occurs in the A-CPU 14 at step 217, the routine returns to step 207 where the retracting traveling mode is set. In this way, the control system is rebooted in the retracting traveling mode.

When it is determined that a malfunction occurs in multiple CPUs at step 217, the routine proceeds to step 218 where the control system is terminated. That is, the control system is rendered Ready-Off.

To the contrary, when it is determined to be "No" at step 212, the routine proceeds to step 219 where it is determined whether the retracting traveling switch 28 is turned ON or it is determined whether the retracting traveling switch 28 is turned ON while the brake is turned ON. When, at step 219, it is determined that the retracting traveling switch 28 is turned ON or it is determined that the retracting traveling switch 28 is turned ON while the brake is turned ON, the routine proceeds to step 220 where it is determined whether the determination of the shift position is N range. When it is determined that the determination of the shift position is the N range at step 220, the routine proceeds to step 216. To the contrary, when it is determined to be "No" at step 219 or when it is determined to be "No" at step 220, the routine returns to step 211.

In this sixth embodiment as described above, when the electric power source of the control system is turned OFF in the retracting traveling mode, and thereafter, when the retracting traveling switch 28 is turned ON or when the retracting traveling switch 28 is turned ON while the brake of the vehicle is turned ON, the control system is rebooted in the retracting traveling mode. In this way, even when the electric power source of the control system is turned OFF in the retracting traveling mode, the control system can be rebooted to enable the retracting traveling again.

Seventh Embodiment

Subsequently, the seventh embodiment of the present disclosure will be described with reference to FIG. 15. It is noted that, the same reference numeral will be given to en element which is the same as or similar to that of the sixth embodiment, and description thereof will be omitted or simplified. Elements distinct from those in the sixth embodiment will be mainly described.

In the present seventh embodiment, when the electric power source of the control system is turned OFF in the retracting traveling mode, and thereafter, when the normal start operation is performed, the driver is notified of, as a reboot method, to turn ON the retracting traveling switch 28 or to turn ON the retracting traveling switch 28 while the brake of the vehicle is turned ON.

Figure 15:
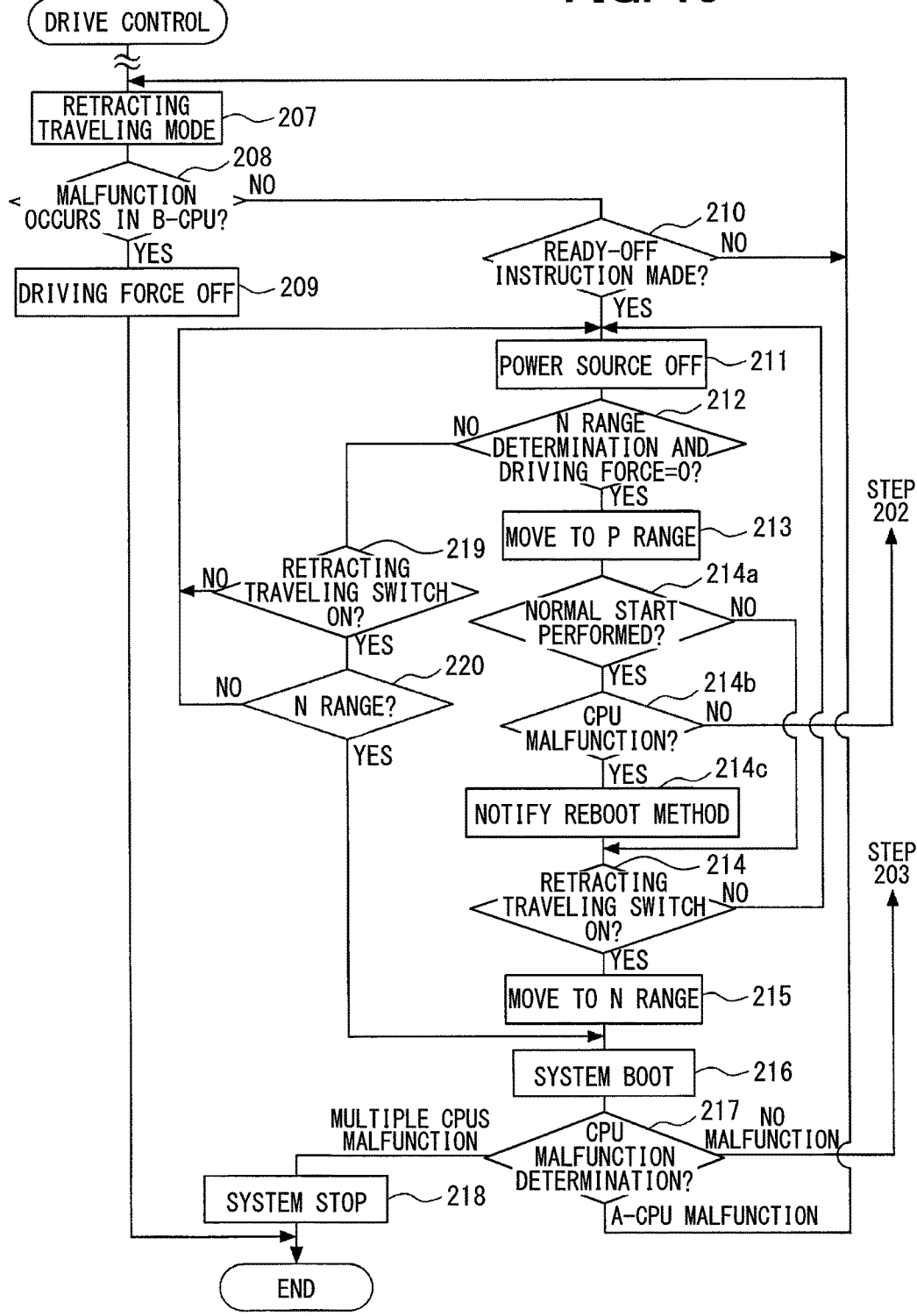
FIG. 15 is a flowchart showing a flow of processing of a start control routine according to a seventh embodiment.

A start control routine in FIG. 15 executed in the present seventh embodiment is that in which processing at steps 214a to 214c is added between step 213 and step 214 of the routine in FIG. 13 and FIG. 14 described in the sixth embodiment. Processing of other steps is the same as that of FIG. 13 and FIG. 14.

In the start control routine of FIG. 15, the retracting traveling mode is set at step 207. Subsequently, when it is determined that an instruction of Ready-Off is present at step 210, the electric power source of the control system is turned OFF at step 211, and the control system is terminated.

Subsequently, at step 212, when it is determined that the shift position is in the N range and when it is determined that the vehicle driving force is 0, the routine proceeds to step 213 where it is determined that the shift position is in the P range.

Subsequently, the routine proceeds to step 214a where it is determined whether the normal start operation is performed. That is, it is determined whether the start switch 29 is turned ON in the state where the shift position is in the P range and where the brake is turned ON. When it is determined that the normal start operation is not performed at step 214a, the routine proceeds to step 214.

To the contrary, when it is determined that the normal start operation is performed at step 214a, the routine proceeds to step 214b where presence or absence of a malfunction in the CPU (for example, A-CPU 14) is determined. When it is determined that no malfunction occurs in the CPU at the step 214b, the routine returns to step 202.

To the contrary, when it is determined that a malfunction occurs in the CPU at step 214b, the routine proceeds to step 214c where the driver is notified of, as the reboot method, to turn ON the retracting traveling switch 28 or to turn ON the retracting traveling switch 28 while the brake of the vehicle is turned ON. In this case, the reboot method is shown with one, two or more of a display device in an instrument panel, a car navigation device, a voice, and an external communication device (for example, a cellular phone or the like). In this way, it steadily enables to notify the driver of the reboot method.

Subsequently, the routine proceeds to step 214 where it is determined whether the retracting traveling switch 28 is turned ON or whether the retracting traveling switch 28 is turned ON while the brake is turned ON. The vehicle start switch 29 may also serve as the retracting traveling switch 28, and it may be determined that the retracting traveling switch 28 is turned ON when a specific operation (for example, long push, double click, or the like) is performed on the start switch 29. In this case, a configuration may be employed where the retracting traveling switch 28 is omitted.

At step 214, when it is determined "No", the routine returns to step 211. Thereafter, at the step 214, when it is determined that the retracting traveling switch 28 is turned ON or when it is determined that the retracting traveling switch 28 is turned ON while the brake is turned ON, the routine proceeds to step 215 where the determination of the shift position is switched from the P range to the N range.

Subsequently, the routine proceeds to step 216 where the electric power source of the control system is turned ON and where the control system is rebooted.

In the present seventh embodiment as described above, when the electric power source of the control system is turned OFF in the retracting traveling mode, and thereafter, when the normal start operation is performed, the driver is notified of, as a reboot method, to turn ON the retracting traveling switch 28 or to turn ON the retracting traveling switch 28 while the brake of the vehicle is turned ON. In this way, when the electric power source of the control system is turned OFF in the retracting traveling mode, the driver can be notified of the reboot method, even in a case where the driver does not know the reboot method. Thus, the control system can be rebooted promptly.

In each the first to seventh embodiments, the present disclosure is applied to the system equipped with the shift sensor which is to detect the five shift positions. It is noted that, it is not limiting. The present disclosure may be applied to a system equipped with a shift sensor which is to detect three or less shift positions or six or more shift positions.

In each of the first to seventh embodiments, the function implemented with the CPU may be partially or entirely configured with one or multiple ICs in a hardware form.

Furthermore, the present disclosure is not limited to be applied to a vehicle which equips the MG as the driving source. The present disclosure may be applied to a vehicle, which equips an engine as a driving source, and to a vehicle which equips an engine and an MG as a driving source.

As described above, the vehicle control device of the present disclosure includes the shift sensor (18), which is to send the multiple signals according to the shift position, which is the manipulated position of the vehicle shift lever 17. The control device includes the drive control unit 13 including multiple control circuits 14, 15, 16, which is relevant to the control of the driving force of the vehicle and is to determine the shift position according to the output signal of the shift sensor. The drive control unit includes the retracting traveling control unit and the determination control unit. The retracting traveling control unit is to, when a malfunction occurs in one control circuit among the multiple control circuits, perform the retracting traveling control to control the driving force of the vehicle with the control circuit (hereinafter, simply referred to the other control circuit) other than the control circuit in which a malfunction occurs. The determination control unit is to perform the reduction determination during the retracting traveling control to determine the shift position according to the output signal of the shift sensor with the other control circuit and to reduce the shift position, which is to be determined, compared with the normal state.

The configuration is to, when a malfunction occurs in one control circuit among the multiple control circuits, perform the retracting traveling control to control the driving force of the vehicle with the other control circuit (that is, the control circuit other than the control circuit in which a malfunction occurs). This enables the vehicle to perform the retracting traveling even when a malfunction occurs in one control circuit. Furthermore, during the retracting traveling control, the reduction determination is performed to determine the shift position according to the output signal of the shift sensor with the other control circuit and to reduce the shift position, which is to be determined, compared with the normal state. This enables the vehicle to determine the shift position and to perform the retracting traveling during the retracting traveling control in which a malfunction occurs in one control circuit. In addition, since the reduction determination is performed, each control circuit is not required to receive all the signals of the shift sensor. The number of the signal lines, which connect the shift sensor with the control circuit, can be reduced compared with a configuration in which each control circuit receives all the signals of the shift sensor, and mountability to a vehicle can be enhanced.

While the present disclosure has been described with reference to embodiments thereof, it is to be understood that the disclosure is not limited to the embodiments and configurations. The present disclosure is intended to cover various modification and equivalent arrangements. In addition, various combinations and configurations, and furthermore, other combinations and configurations, including more, less or only a single element, are also within the spirit and scope of the present disclosure.

The invention claimed is:

1. A vehicle control device equipped with a shift sensor, which is to send a plurality of signals according to a shift position of a number of shift positions being a manipulated position of a vehicle shift lever, the vehicle control device comprising:
   a drive control unit including a plurality of control circuits relevant to a control of a driving force of a vehicle and to determine the shift position according to an output signal of the shift sensor, wherein
   the drive control unit includes:
   a retracting traveling control unit to perform a retracting traveling control, when a malfunction occurs in one control circuit among the plurality of control circuits, to control the driving force of the vehicle with an other control circuit other than the control circuit in which the malfunction occurs; and
   a determination control unit
      to perform a reduction determination during the retracting traveling control to determine the shift position according to the output signal of the shift sensor with the other control circuit and
      to reduce the number of shift positions, which is to be determined, compared with a normal state,
   the drive control unit includes three control circuits as the plurality of control circuits and is connected with the shift sensor,
   one control circuit among the three control circuits is a control circuit for malfunction-state determination,
   the drive control unit is
      to cause two control circuits, which are other than the control circuit for malfunction-state determination, among the three control circuits to receive all signal corresponding to each shift position of the shift sensor and
      to cause the control circuit for malfunction-state determination to receive a signal, and
   a number of the signal received with the control circuit for malfunction-state determination is less than a number of the all signal received with the two control circuits.

2. A vehicle control device equipped with a shift sensor, which is to send a plurality of signals according to a shift position of a number of shift positions being a manipulated position of a vehicle shift lever, the vehicle control device comprising:
   a drive control unit including a plurality of control circuits relevant to a control of a driving force of a vehicle and to determine the shift position according to an output signal of the shift sensor, wherein
   the drive control unit includes:
   a retracting traveling control unit to perform a retracting traveling control, when a malfunction occurs in one control circuit among the plurality of control circuits, to control the driving force of the vehicle with an other control circuit other than the control circuit in which the malfunction occurs; and a determination control unit
to perform a reduction determination during the retracting traveling control to determine the shift position according to the output signal of the shift sensor with the other control circuit and
to reduce the shift position, which is to be determined, compared with a normal state,
the determination control unit is, when performing the reduction determination during the retracting traveling control, to limit the shift position, which is to be determined, within a forward range, a reverse range, and a neutral range,
the drive control unit includes three control circuits as the plurality of control circuits and is connected with the shift sensor,
one control circuit among the three control circuits is a control circuit for malfunction-state determination, and
the drive control unit is
to cause two control circuits, which are other than the control circuit for malfunction-state determination, among the three control circuits to receive all signal corresponding to each shift position of the shift sensor and
to cause the control circuit for malfunction-state determination to receive a signal corresponding to the forward range and a signal corresponding to the reverse range of the shift sensor.

3. A vehicle control device equipped with a shift sensor, which is to send a plurality of signals according to a shift position of a number of shift positions being a manipulated position of a vehicle shift lever, the vehicle control device comprising:
a drive control unit including a plurality of control circuits relevant to a control of a driving force of a vehicle and to determine the shift position according to an output signal of the shift sensor, wherein
the drive control unit includes:
a retracting traveling control unit to perform a retracting traveling control, when a malfunction occurs in one control circuit among the plurality of control circuits, to control the driving force of the vehicle with an other control circuit other than the control circuit in which the malfunction occurs; and
a determination control unit
to perform a reduction determination during the retracting traveling control to determine the shift position according to the output signal of the shift sensor with the other control circuit and
to reduce the number of shift positions, which is to be determined, compared with a normal state,
the determination control unit is, when performing the reduction determination during the retracting traveling control,
to determine the shift position with two or more of the other control circuits,
to compare determination results of the shift position to determine presence or absence of the malfunction, and
to determine that the shift position is in a neutral range when determining that the malfunction occurs, and
the determination control unit is, in a case where the malfunctioning control circuit cannot be identified during the retracting traveling control and when determination results of two control circuits among the multiple control circuits simultaneously changes to a same position on an operation of the shift lever by a driver, to determine that the two control circuits are normal and to determine that a remaining at least one control circuit among the multiple control circuits is malfunctioning.

4. A vehicle control device equipped with a shift sensor, which is to send a plurality of signals according to a shift position of a number of shift positions being a manipulated position of a vehicle shift lever, the vehicle control device comprising:
a drive control unit including a plurality of control circuits relevant to a control of a driving force of a vehicle and to determine the shift position according to an output signal of the shift sensor, wherein
the drive control unit includes:
a retracting traveling control unit to perform a retracting traveling control, when a malfunction occurs in one control circuit among the plurality of control circuits, to control the driving force of the vehicle with an other control circuit other than the control circuit in which the malfunction occurs; and
a determination control unit
to perform a reduction determination during the retracting traveling control to determine the shift position according to the output signal of the shift sensor with the other control circuit and
to reduce the number of shift positions, which is to be determined, compared with a normal state,
the determination control unit is to maintain a latest shift position, which is determined with the other the control circuit, as a previous value when the malfunction occurs in one control circuit among the plurality of control circuits, and
the determination control unit is, during the retracting traveling control,
to determine that the shift position is a current value when the current value of the shift position determined with the other control circuit is same as the previous value, and
to determine that the shift position is a neutral range or to limit a driving force of the vehicle within a safe level when the current value changes to a position different from the previous value.

5. A vehicle control device equipped with a shift sensor, which is to send a plurality of signals according to a shift position of a number of shift positions being a manipulated position of a vehicle shift lever, the vehicle control device comprising:
a drive control unit including a plurality of control circuits relevant to a control of a driving force of a vehicle and to determine the shift position according to an output signal of the shift sensor, wherein
the drive control unit includes:
a retracting traveling control unit to perform a retracting traveling control, when a malfunction occurs in one control circuit among the plurality of control circuits, to control the driving force of the vehicle with an other control circuit other than the control circuit in which the malfunction occurs; and
a determination control unit
to perform a reduction determination during the retracting traveling control to determine the shift position according to the output signal of the shift sensor with the other control circuit and to reduce the number of shift positions, which is to be determined, compared with a normal state; and a retracting traveling switch to set a retracting traveling mode to perform the retracting traveling control; and a reboot control unit to reboot the control system in the retracting traveling mode, when an electric power source of the control system, which includes the drive control unit, is turned OFF during the retracting traveling mode, and thereafter, when the retracting traveling switch is turned ON or when the retracting traveling switch is turned ON while a brake of the vehicle is turned ON, wherein the reboot control unit is, when the control system is rebooted in the retracting traveling mode, to switch determination of the shift position from a parking range to a neutral range.

6. The vehicle control device according to claim 5, wherein the reboot control unit is to turn ON the retracting traveling switch or to turn ON the retracting traveling switch while the brake of the vehicle is turned ON, when the electric power source of the control system is turned OFF during the retracting traveling mode, and thereafter, when a normal start operation is performed, to notify a driver of, as a reboot method.

7. The vehicle control device according to claim 6, wherein the reboot control unit is to notify the reboot method with at least one of a display device, a car navigation, a voice, and an external communication device.

* * * * *